(12) United States Patent
Jolly et al.

(10) Patent No.: US 9,800,032 B2
(45) Date of Patent: Oct. 24, 2017

(54) WHILE-IN-USE OUTDOOR COVER WITH RECESSED ELECTRICAL DEVICE

(71) Applicant: Thomas & Betts International LLC, Wilmington, DE (US)

(72) Inventors: Robert Kevin Jolly, Cordova, TN (US); Peter J. Gallucci, Collierville, TN (US)

(73) Assignee: Thomas & Betts International LLC, Wilmington, DE (US)

( * ) Notice: Subject to any disclaimer, the term of this patent is extended or adjusted under 35 U.S.C. 154(b) by 337 days.

(21) Appl. No.: 14/339,617

(22) Filed: Jul. 24, 2014

(65) Prior Publication Data

US 2015/0083485 A1 Mar. 26, 2015

Related U.S. Application Data

(60) Provisional application No. 61/881,047, filed on Sep. 23, 2013.

(51) Int. Cl.
  *H02B 1/42* (2006.01)
  *H02G 3/08* (2006.01)
  *H02G 3/14* (2006.01)

(52) U.S. Cl.
  CPC ............... *H02G 3/081* (2013.01); *H02G 3/14* (2013.01)

(58) Field of Classification Search
  CPC .................................. H02G 3/081; H02G 3/14
  USPC ....................................................... 174/500
  See application file for complete search history.

(56) References Cited

U.S. PATENT DOCUMENTS

| | | | |
|---|---|---|---|
| 4,803,307 A | 2/1989 | Shotey | |
| 5,257,946 A | 11/1993 | MacMillan et al. | |
| 5,574,256 A | 11/1996 | Cottone | |
| 5,600,093 A | 2/1997 | Herth et al. | |
| 6,956,171 B1 | 10/2005 | Gretz | |
| 6,965,078 B1 * | 11/2005 | Gretz | H02G 3/123 174/58 |
| 7,005,578 B2 | 2/2006 | Gretz | |
| 7,038,131 B1 | 5/2006 | Gretz | |
| 7,115,820 B1 * | 10/2006 | Gretz | H02G 3/123 174/481 |
| 7,241,952 B2 * | 7/2007 | Dinh | H02G 3/14 174/66 |
| 7,374,058 B2 * | 5/2008 | Dinh | H02G 3/088 220/3.8 |
| 7,381,894 B1 | 6/2008 | Shotey et al. | |

(Continued)

*Primary Examiner* — Timothy Thompson
*Assistant Examiner* — Rhadames J Alonzo Miller
(74) *Attorney, Agent, or Firm* — Taft Stettinius & Hollister LLP

(57) ABSTRACT

A while-in-use cover assembly includes a hood and a base connected to the hood. The base includes a first side wall and a first back wall forming a first cavity with a first opening opposite the first back wall. The hood covers the first opening, the first side wall includes a first side wall edge and a second side wall edge opposite the first side wall edge. The first side wall edge is proximate to the first opening, and the second side wall edge is proximate to the first back wall. The first back wall includes a second opening to a second cavity. A second side wall defines the second cavity and extends from the first back wall from the first opening. The first cavity and the second cavity provide access through the first opening and the second opening to an electrical device coupled to the second side wall.

15 Claims, 7 Drawing Sheets

(56) References Cited

U.S. PATENT DOCUMENTS

| | | | |
|---|---|---|---|
| 7,396,996 B1 * | 7/2008 | Shotey | H02G 3/14 174/481 |
| 7,435,900 B1 * | 10/2008 | Gretz | H01R 25/006 174/480 |
| 7,476,806 B2 | 1/2009 | Dinh | |
| 7,518,061 B1 | 4/2009 | Gretz | |
| 7,598,452 B1 * | 10/2009 | Shotey | H01R 13/5213 174/66 |
| 7,598,454 B1 * | 10/2009 | Baldwin | H02G 1/081 174/66 |
| 7,619,163 B1 * | 11/2009 | Shotey | H02G 3/14 174/135 |
| 7,626,121 B1 * | 12/2009 | Cleghorn | H02G 3/14 174/53 |
| 7,820,912 B1 * | 10/2010 | Shotey | H02G 3/12 174/53 |
| 7,947,901 B2 * | 5/2011 | Leopold | H02G 3/088 174/50 |
| 8,013,245 B2 * | 9/2011 | Korcz | H02B 1/52 174/53 |
| 8,101,861 B1 | 1/2012 | Shotey et al. | |
| 8,106,295 B1 * | 1/2012 | Shotey | H02G 3/14 174/66 |
| 8,258,401 B1 | 9/2012 | Shotey et al. | |
| 2005/0274538 A1 * | 12/2005 | Gretz | H02G 3/123 174/67 |
| 2006/0016809 A1 * | 1/2006 | Dinh | H02G 3/14 220/3.8 |
| 2009/0211779 A1 * | 8/2009 | Drane | H02G 3/14 174/67 |
| 2010/0181091 A1 * | 7/2010 | Drane | H02G 3/14 174/66 |
| 2012/0048590 A1 * | 3/2012 | Drane | H02G 3/14 174/67 |
| 2012/0312577 A1 | 12/2012 | Carbone et al. | |
| 2014/0262418 A1 * | 9/2014 | Korcz | H02G 3/088 174/67 |

* cited by examiner

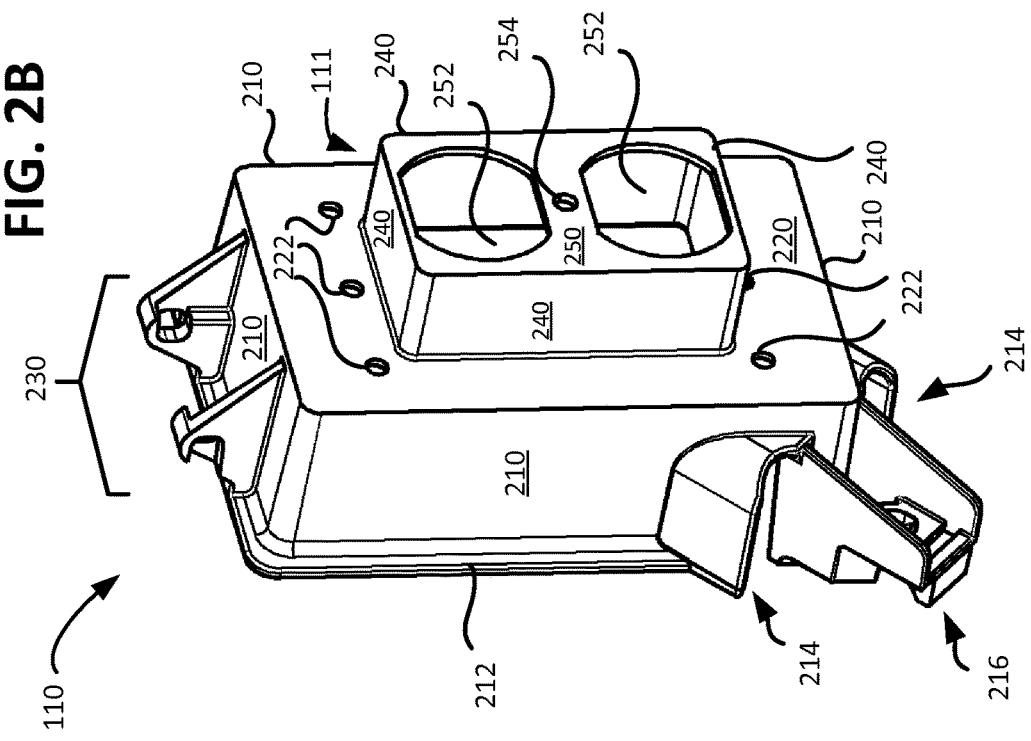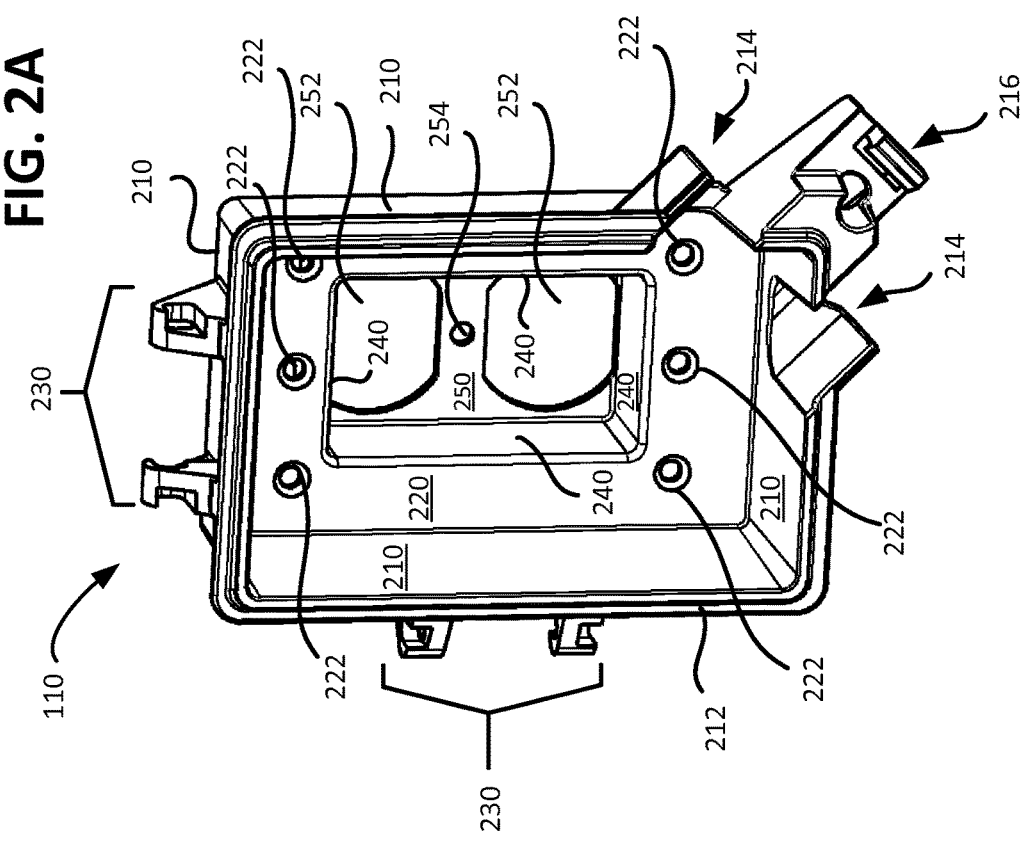

WHILE-IN-USE OUTDOOR COVER WITH RECESSED ELECTRICAL DEVICE

CROSS-REFERENCE TO RELATED APPLICATION

This application claims priority under 35 U.S.C. §119, based on U.S. Provisional Patent Application No. 61/881,047, filed on Sep. 23, 2013, the disclosure of which is herein incorporated by reference.

BACKGROUND INFORMATION

While-in-use (WIU) covers may be used to provide an enclosed housing for an electrical device, such as an electrical receptacle, and a related item, such as an electric plug inserted into the electrical device. The WIU cover may protect the electrical device and the plug from dust, moisture, and other environmental factors and may help prevent the electrical device and the related item from inadvertently contact. For example, a WIU cover may be used to cover an electrical receptacle on the outside of a house.

BRIEF DESCRIPTION OF THE DRAWINGS

FIGS. 2A and 2B provide, respectively, a front perspective view and a rear perspective view of an exemplary base included in the WIU cover assembly of FIGS. 1A and 1B according to implementations described herein;

DETAILED DESCRIPTION OF PREFERRED EMBODIMENTS

The following detailed description refers to the accompanying drawings. The same reference numbers in different drawings may identify the same or similar elements.

A while-in-use (WIU) cover may extend a distance from a wall to which the WIU cover is mounted to provide a sufficient internal cavity space to accommodate an electrical device and related item, such as a plug. Because the WIU cover extends from the wall, the WIU cover may be aesthetically unpleasing and may interfere with a passing user.

According to implementations described herein, a WIU cover assembly may include a base and a hood that opens and closes. The WIU cover assembly may be connected to an electrical box and/or a wall. The base may have a back wall that includes a recessed portion, and an electrical device may be connected to the recessed portion. The WIU cover assembly may enable electrical device to be positioned within the electrical box such that WIU cover assembly provides a sufficiently large cavity to accommodate an electrical device and/or a related item such as a cord while reducing an extent that the WIU Cover extends from the wall and/or the electrical box.

In descriptions herein, the terms "front" or "forward" may generally refer to a direction from an electrical box, and the terms "back," "rear," or "rearward" may generally refer to a direction toward the electrical box.

Figure 1A:
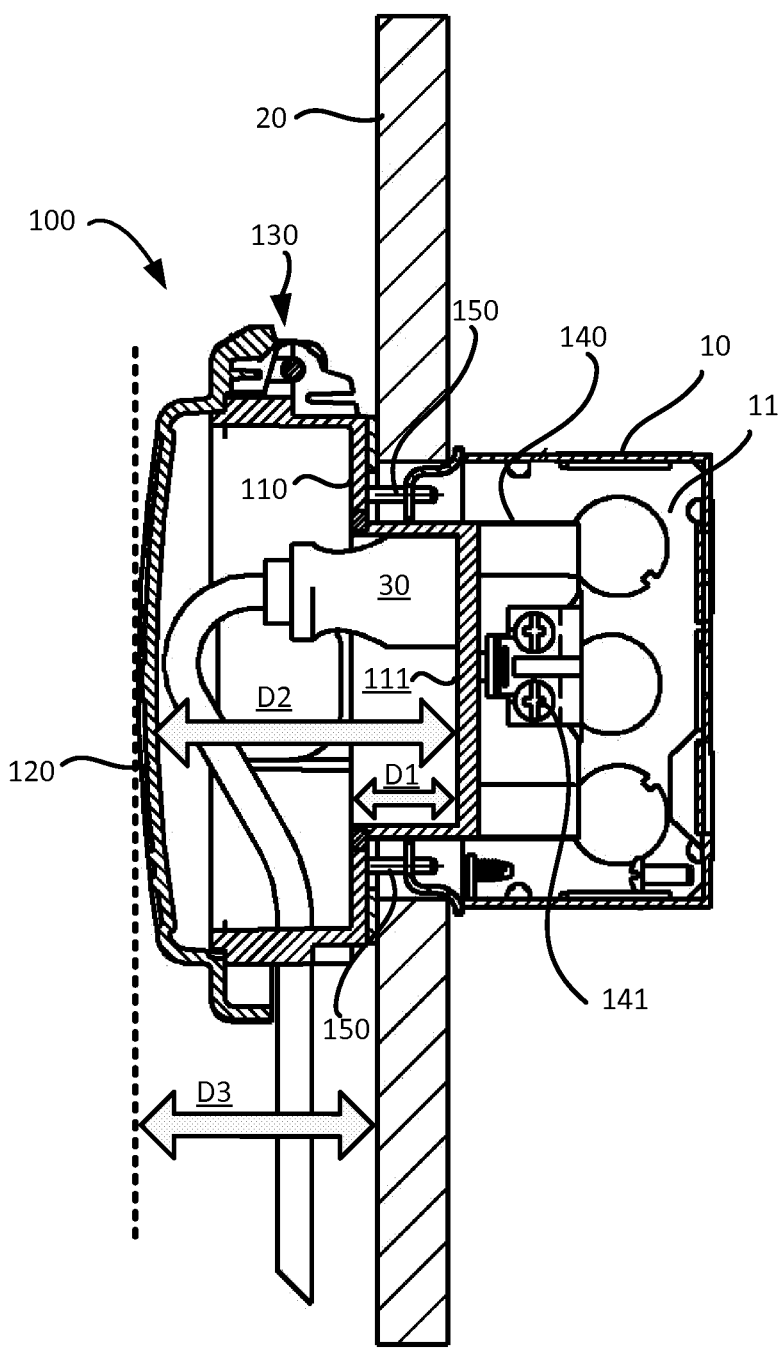
FIGS. 1A and 1B provide, respectively, a cross-sectional view and an exploded perspective view of an exemplary while-in-use (WIU) cover assembly according to implementations described herein.
Figure 1B:
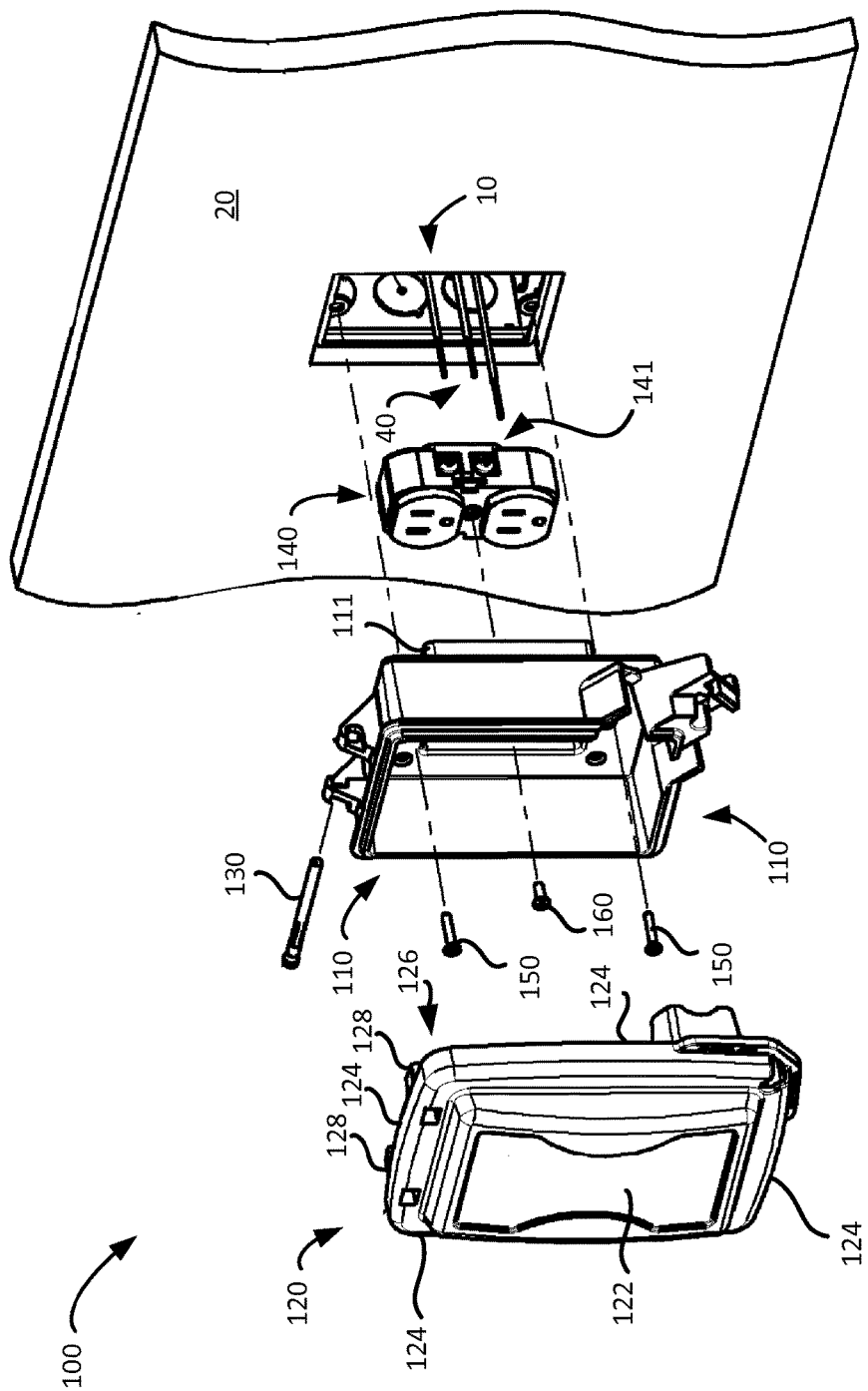

FIGS. 1A and 1B provide, respectively, a cross-sectional view and an exploded perspective view of exemplary WIU cover assembly 100 according to implementations described herein. As provided collectively in FIGS. 1A and 1B, WIU cover assembly 100 may include base 110, hood 120, hinge pin 130 connecting base 110 and hood 120, and electrical device 140 that is connected to base 110. The WIU cover assembly 100 is configured with hood 120 being mateable with base 110 via a cooperative mating assembly formed at one or more separate locations thereon. WIU cover assembly 100 may be mounted to electrical box 10 (see, for example, FIG. 5) and/or wall 20 by connectors 150. Electrical device 140 may be connected to wires 40 within electrical box 10. Electrical device 140 may include, for example, an electrical receptacle for receiving a plug.

Base 110 may include recess portion 111 with a recess depth D1, and electrical device 140 may be connected to a back wall of recess portion 111. When WIU cover assembly 100 is mounted to electrical box 10 and/or wall 20, recess portion 111 may position electrical device 140 within electrical box cavity 11 of electrical box 10 and away from wall 20. WIU cover assembly 100 may be structured to define an internal cavity that has a sufficiently internal depth D2 to enable electric plug 30 to be mated to electrical device 140 within WIU cover assembly 100 when hood 120 is closed. Some of internal depth D2 may be provided by recess depth D1 associated with recess portion 111. Thus, external depth D3, that WIU cover assembly 100 extends from electrical box 10 and/or wall 20, may be smaller than internal depth D2. Electrical device 140 may be secured to base 110 and may not be connected to either electrical box 10 and/or wall 20.

FIGS. 2A and 2B provide, respectively, a front perspective view and a rear perspective view of exemplary base 110 according to an implementation described herein. As provided collectively in FIGS. 2A and 2B, base 110 may include base side walls 210 that extend forward to base edge 212 and may extend backwards to connect to a substantially flat back wall 220 to form a structure with an open front face that may mate to hood 120 (see FIGS. 1A and 1B).

Base side walls 210 may include one or more opening 214 to receive, for example, a portion of electric plug 30. Base side walls 210 may further include a side wall structure 216. Side wall structure 216 may, for example, guide a portion of electric plug 30 toward opening 214 and/or may engage a portion of hood 120. By engaging the portion of hood 120, side wall structure 216 may prevent hood 120 from inadvertently opening, such as when a passing user contacts hood 120. Base side walls 210 may further include base hinge mounts 230 to connect base 110 to hood 120 using, for example, hinge pin 130.

Back wall 220 may include an opening to recess portion 111. For example, back wall 220 may attach to recess side walls 240 of recess portion 111. Recess side walls 240 may extend backwards, from back wall 220, to recess back wall 250. In this way, recess portion 111, as defined by recess side walls 240 and recess back wall 250, may extend past back wall 220. Back wall 220 may also include one or more attachment points 222 that allow base 110 to engage or attach to, for example, to electrical box 10 and/or wall 20. As provided in FIG. 1B, connectors 150 (e.g., screws, nails, etc.) may pass through attachment points 222 to connect based 110 to electrical box 10 and/or wall 20.

Recess back wall 250 may be structured to connect to electrical device 140. For example, recess back wall 250 may include one or more recess openings 252 to receive a portion of electrical device 140. In the particular implementation depicted in FIGS. 2A and 2B, recess openings 252 may be shaped to receive, as electrical device 140, an electrical receptacle. Recess back wall 250 may include recess connection point 254, and electrical device 140 may be connected to recess back wall 250 via recess connection point 254. For example, as provided in FIG. 1B, electrical device connector 160 (e.g., a screw) may be inserted into recess connection point 254 to connect electrical device 140 to recess back wall 250. In this implementation, different types of electrical devices 140 may be connected to recess portion 111 for use with WIU cover assembly 100, as desired. For example, electrical device 140 may be selected such that electrical device 140 and recess back wall 250 are composed of different materials, such as a metal material (e.g., bronze, stainless steel, zinc-coated steel, etc.) and/or a non-metal material (nylon, plastic, polycarbonate, composite, ceramic, etc.). For example, one of electrical device 140 may be constructed from a conductive material and recess back wall 250 may be constructed from a non-conductive material. The use of respective different materials for electrical device 140 and recess back wall 250 may prevent, for example, an undesired current between base 110 and electrical device 140.

Figure 3B:
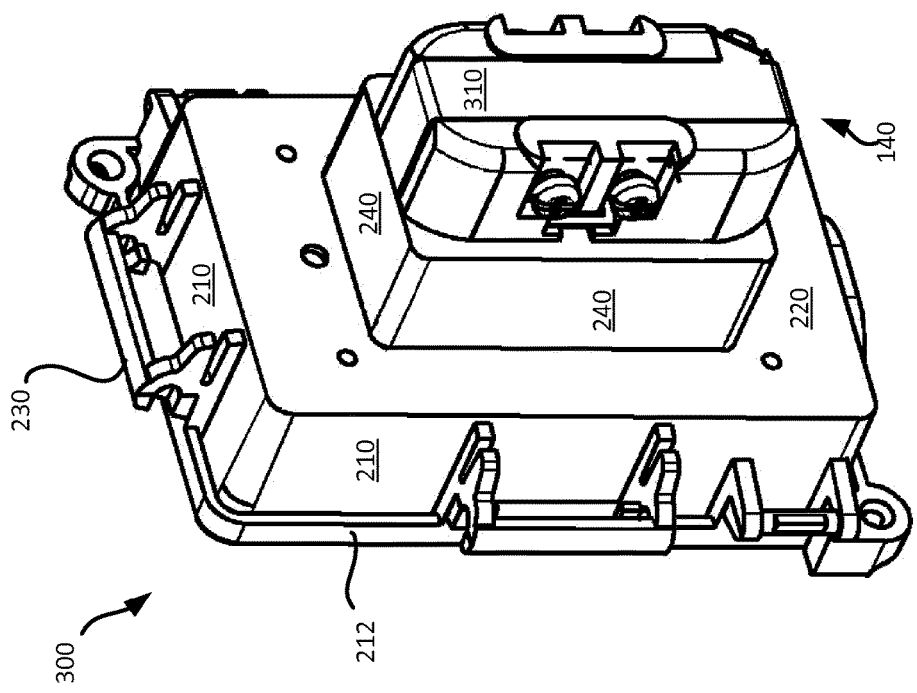
FIGS. 3A and 3B provide, respectively, a front perspective view and a rear perspective view of an exemplary base included in the WIU cover assembly of FIGS. 1A and 1B according to implementations described herein.
Figure 3A:
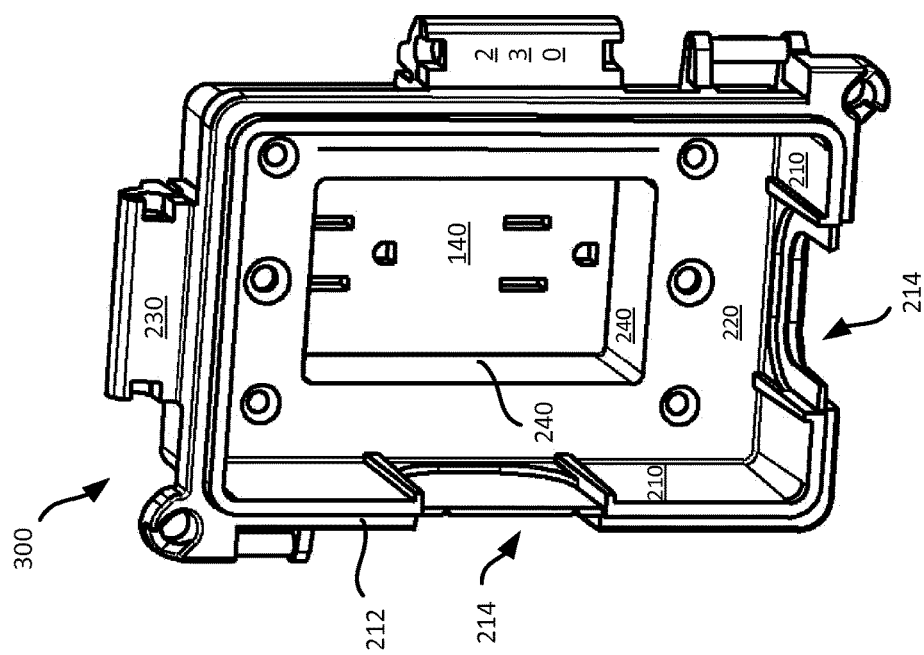

FIGS. 3A and 3B provide, respectively, a front perspective view and a rear perspective view of exemplary compound structure 300 according to an implementation described herein. As provided collectively in FIGS. 3A and 3B, compound structure 300 may include base 110 and electrical device 140. Compound structure 300 may include electrical device 140 connected to recess side walls 240 and/or recess back wall 250. For example, electrical device 140 may be integrally formed with recess side walls 240 and/or back wall 250. Alternatively, as provided in FIG. 3B, strap 310 (or another type of connection structure such as a clamp, screw, etc. or a bonding material such as glue or epoxy) may connect electrical device 140 to base 110. In this implementation, base 110 may not include back wall 250.

Figure 4:
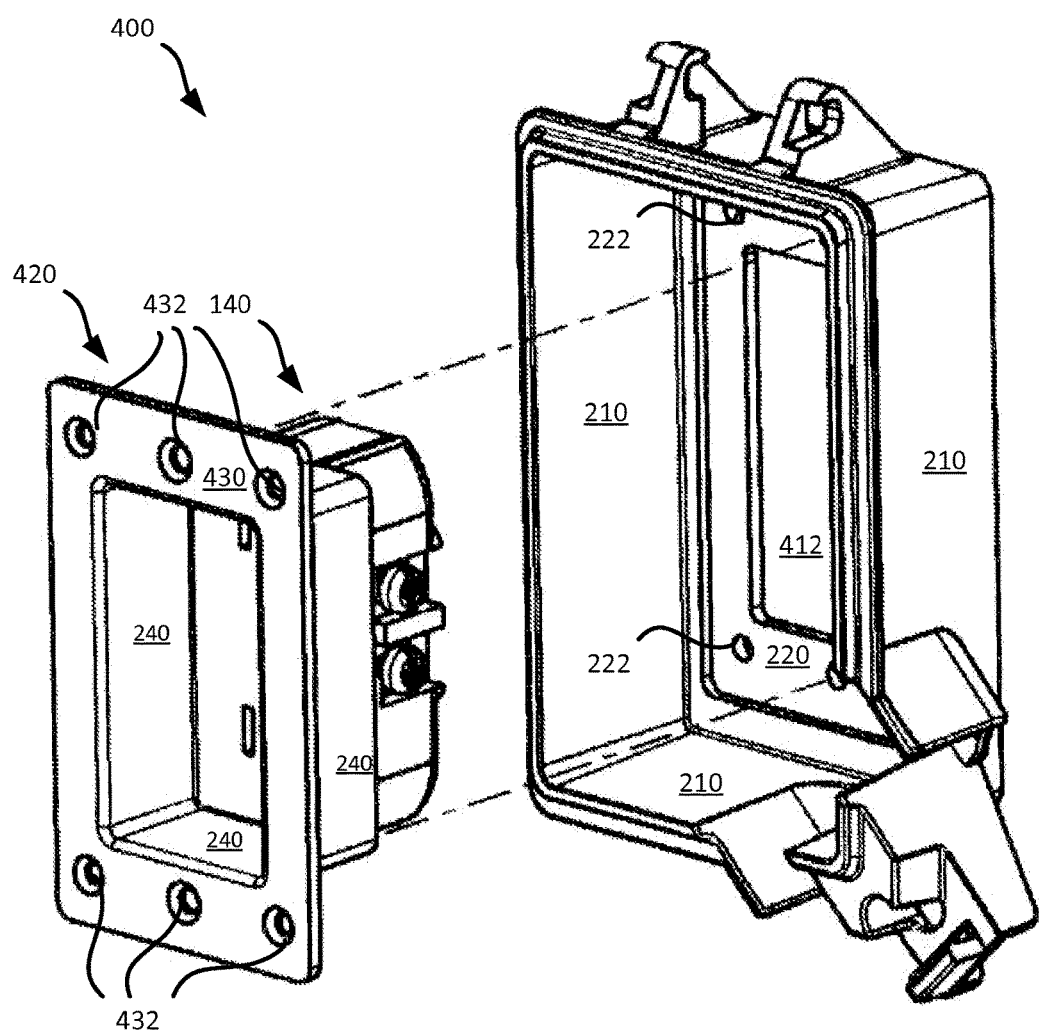
FIG. 4 provides a front perspective view of an exemplary base included in the WIU cover assembly of FIGS. 1A and 1B according to an implementation described herein.

FIG. 4 provides a front perspective view of base 110 according to another implementation described herein. As provided in FIG. 4, base 110 may include composite structure 400. In composite structure 400, back wall 220 may include opening 412. Insert 420 may include, for example, electrical device 140 and recess side walls 240. Insert 420 may be that is sized to inserted through opening 412. When positioned adjacent to back wall 220, insert 420, may pass electrical device 140 and recess side walls 240 through opening 412.

Different types of insert 420 may be used, for example, to enable different types of electrical devices 140 to be used. For example, different types of insert 420 may be associated with, respectively, different electrical receptacles, switches, etc. Furthermore, different types of insert 420 may be composed of various types of materials. For example, insert 420 and electrical device 140 may be composed of different materials (e.g., a conductive material and a non-conductive material) to minimize electrical conduction between insert 420 and electrical device 140. Alternatively, insert 420 and electrical device 140 may be composed of similar materials, such as when insert 420 and electrical device 140 are integrally formed. Different inserts 420 may also include respective different sized recess side walls 240 that are associated with, respectively, different recess depths D1. A particular insert 420 may be selected as needed to position electrical device 140 to a desired position within electrical box 10. For example, insert 420 may be selected to position electrical device 140 at a sufficient distance from a surface of electrical box 10 and/or to provide sufficient space to attach wires 40 to electrical device 140.

Insert 420 may further include flange 430. Flange 430 may engage or connect to base back wall 220. For example, flange 430 may include one or more flange openings 432 that may be used to mate insert 420 to base back wall 220. For example, flange openings 432 may line up with attachment points 222. Connectors 150, when inserted into attachment points 222 to connect WIU cover assembly 100 to electrical box 10 and/or wall 20, may also attach flange 430 of insert 420 to base back wall 220.

Referring again to FIGS. 1A and 1B, hood 120 may have a substantially flat, rectangular front wall 122 and hood side walls 124 around the perimeter of front wall 122 that may extend from front wall 122 and may terminate in hood edge 126 (e.g., a flanged edge) to form the box-like structure with an open rear opposite front wall 122 of base 110. The dimensions of the box-like structure associated with hood 120 may be selected such that part of hood edge 126 extends over base edge 212 when hood 120 is positioned over base 110. By partially extending over base edge 212, hood 120 may form an enclosed space that protects electrical device 140 and/or electric plug 30 from environmental factors. As previously described, a portion of the enclosed space associated with base 110 and hood 120 may be associated with recess portion 111 to reduce depth D3 that WIU cover extends from wall 20.

Base 110 and hood 120 may be made from one or more of a metal material (e.g., bronze, stainless steel, zinc-coated steel, etc.) or a non-metal material (nylon, plastic, polycarbonate, composite, ceramic, etc.).

Side wall 124 of hood 120 may include one or more hood hinge mounts 128 that engage base hinge mounts 230 of base 110 for pivotally attaching base 110 and hood 120. For example, hood hinge mounts 128 and base hinge mounts 230 may be positioned at any side surface of WIU cover assembly 100 (e.g., a top, a side, or bottom side). Hood hinge mounts 128 and base hinge mounts 230 may physically couple base 110 and hood 120. Hood hinge mounts 128 and base hinge mounts 230 may be connected using, for example, hinge pin 130.

Hinge pin 130, may be separate from hood 120 and base 110. Hinge pin 130 may include a cylindrical stem having a chamfered end at one end and a head at the other end of hinge pin 130. Hinge pin 130 may be configured to be axially inserted into a mating assembly that includes hood hinge mounts 128 and base hinge mounts 230. Hinge pin 130 may be made from a metal material (e.g., bronze, stainless steel, zinc-coated steel, etc.) and/or a non-metal material (nylon, plastic, polycarbonate, composite, ceramic, etc.). In one implementation, hinge pin 130 may be made of the same material as one or both of base 110 or hood 120. In other implementations, hinge pin 130 may be made from a different material than hood 120 and base 110.

Figure 5:
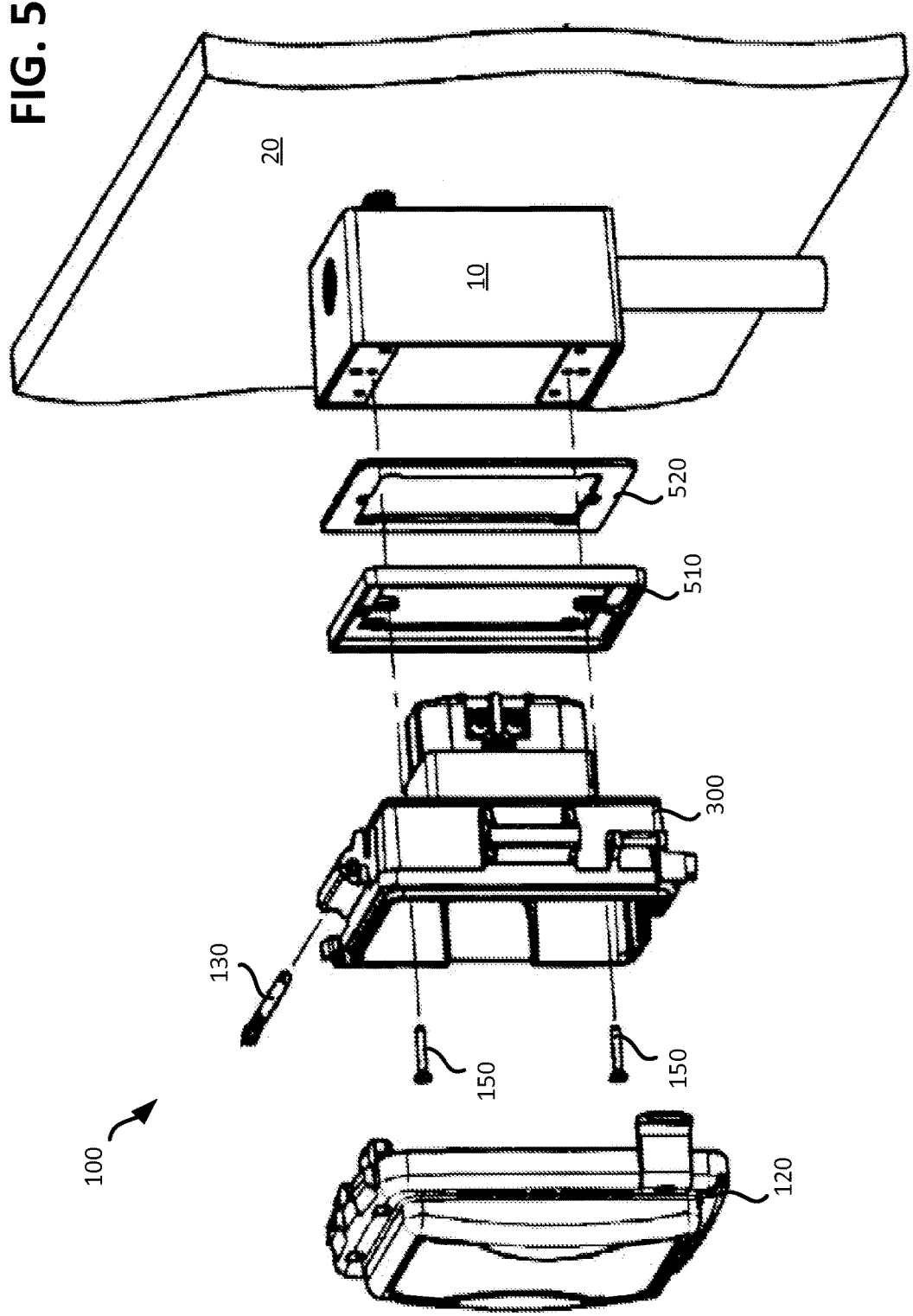
FIG. 5 provides an exploded side view of an exemplary WIU cover assembly according to an implementation described herein.

FIG. 5 provides a side exploded view of exemplary WIU cover assembly 100 according to an implementation described herein. In the implementation provided in FIG. 5, spacer plate 510 and/or gasket 520 may be included in WIU cover assembly 100. Spacer plate 510 may be constructed from a rigid material, such as a metal material (e.g., bronze, stainless steel, zinc-coated steel, etc.) and/or a non-metal material (nylon, plastic, polycarbonate, composite, ceramic, etc.), and gasket 520 may be constructed from a pliable material such as silicon, rubber, or a non-rigid plastic. Spacer plate 510 and/or gasket 520 may be positioned between base 110 and electrical box 10 and/or wall 20. For example, as provided in FIG. 5, connectors 150, when attaching base 110 to electrical box 10 and/or wall 20, may also pass through or otherwise engage spacer plate 510 and/or gasket 520. Positioning spacer plate 510 and/or gasket 520 between base 110 and electrical box 10 and/or wall 20 may help seal WIU cover assembly 100 and electrical box 10 to prevent environmental contamination. Furthermore, spacer plate 510 and/or gasket 520 may have respective dimensions to space or otherwise position electrical device 140 as desired within electrical box 10. For example, one or more spacer plates 510 and/or gaskets 520 may be used to position electrical device 140 within electrical box 10 with adequate space for wire 40 to connect to electrical device 140.

Figure 6:
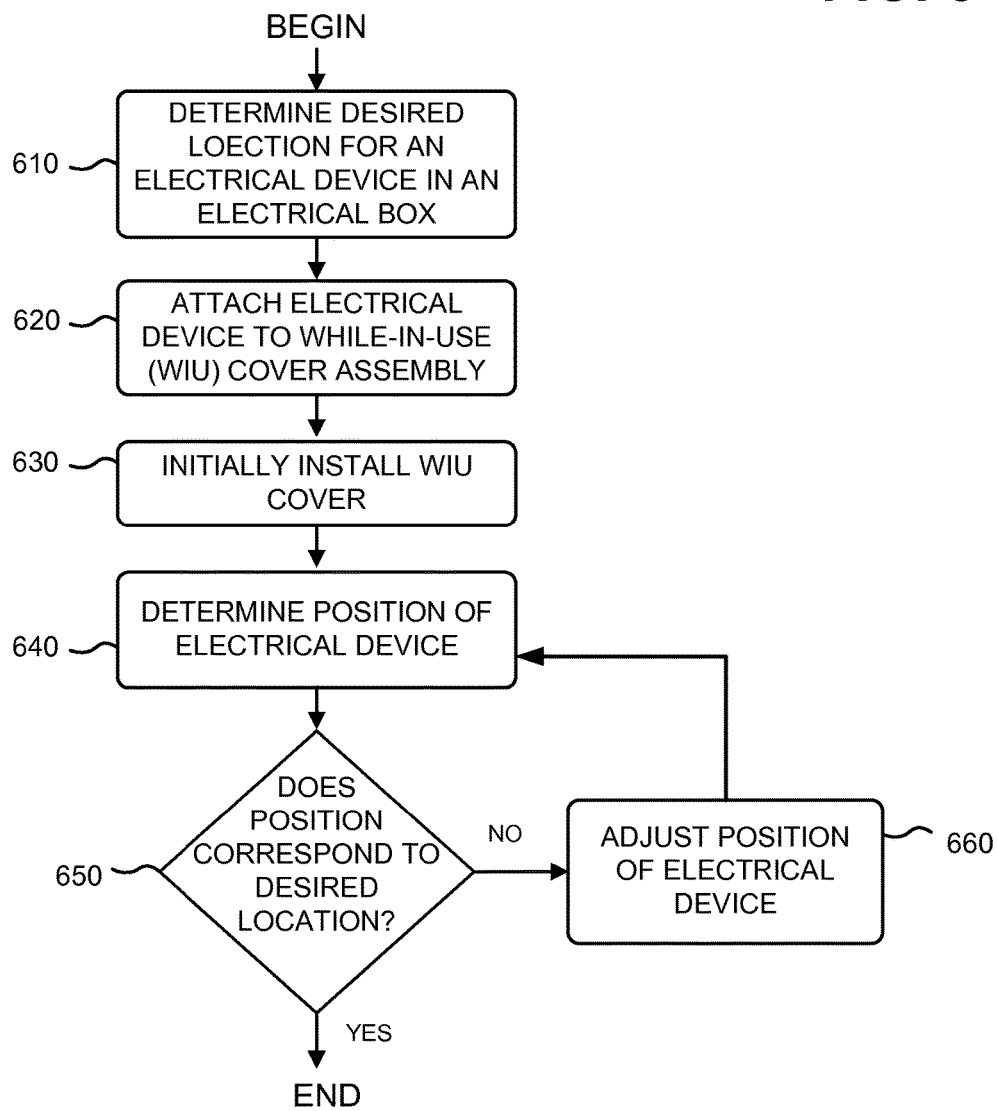
FIG. 6 provides a flow diagram for a process of positioning an electrical device within an electrical box using the WIU cover assembly of FIGS. 1A, 1B, and 5 according to an implementation described herein.

FIG. 6 provides an exemplary flow diagram for process 600 of positioning an electrical device within an electrical box using, for example, WIU cover assembly 100 of FIGS. 1A, 1B, and 5. A desired location for an electrical device within an electrical box may be determined (block 610). For example, the desired location may position electrical device 140 such that electrical device does not contact side walls of electrical box 10 or is at least a threshold distance from the sides of electrical box 10.

Electrical device may be attached to a WIU cover assembly, such as WIU cover assembly 100 described with respect to FIGS. 1A, 1B, and 5 (block 620). For example, as described with respect to FIGS. 1A, 1B, and 5, electrical device 140 may integrally attached, connected using a screw, or connected using a strap to WIU cover assembly 100.

The WIU cover assembly, that includes the electrical device, may then be initially installed (block 630). For example, WIU cover assembly 100 may be directly connected to electrical box 10 (see FIG. 5) or wall 20 associated with electrical box 10 (see FIGS. 1A and 1B).

The position of the electrical device in electrical box 10 may be determined based on the installation of the WIU cover assembly (block 640), and the position of the electrical device may be compared to desired location (block 650). For example, electrical device 140 and electrical box 10 may be evaluated to determine whether electrical device 140 contacts any walls of electrical box 10 and/or is located at least the threshold distance from the sides of electrical box 10.

If the electrical device is positioned at the desired location, process 600 may end, and if electrical device is not positioned at the desired location, the position of the electrical device may be adjusted (block 660). For example, if WIU cover assembly 100 causes electrical device 140 to be positioned too far within electrical box 10, one or more spacing elements, such as spacer plate 510 and/or gasket 520, may be positioned between WIU cover assembly 100 and electrical box 10 to reposition electrical device 140. (see FIG. 5). If WIU cover assembly 100 causes electrical device 140 to be positioned an insufficient distance within electrical box 10, the configuration of WIU cover assembly 100 may also be adjusted to reposition electrical device 140. For example, different types of inserts 420 with different recess side walls 240 may be used to adjust an insertion depth of electrical device 140 into electrical box 10 (see FIG. 4).

Although FIG. 6 provides an exemplary process 600 for positioning electrical device 140 within an electrical box 10 using WIU cover assembly 100, additional, fewer, or different steps may be used in other implementations that differ from exemplary process 600. For example, in other implementations of process 600, an internal cavity within WIU cover assembly 100 may be evaluated to determine whether the WIU cover assembly 100 provides a sufficiently deep internal cavity to accept electric plug 30, and the configuration of WIU cover assembly 100 may be adjusted (e.g., by adjusting insert 420) to provide the sufficiently large internal cavity.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments. For example, although electrical device 140 is depicted as an electrical outlet in FIGS. 1A-4, WIU cover assembly may include a variety of different types of electrical devices 140, such as a light switch, a ground fault circuit interruption (GFCI) device, a dimmer switch, a timer, a data/phone/cable connection, etc.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above mentioned description is to be considered exemplary, rather than limiting, and the true scope of the invention is that defined in the following claims.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:
1. An apparatus comprising:
a hood; and
a base connected to the hood, the base including:
a first side wall and a first back wall forming a first cavity with a first opening opposite the first back wall, wherein:
the hood is configured to cover the first opening,
the first side wall includes a first side wall edge and a second side wall edge opposite the first side wall edge, the first side wall edge being proximate to the first opening and the second side wall edge being proximate to the first back wall, and
the first back wall includes a second opening to a second cavity, and
a second side wall defining the second cavity and extending from the first back wall away from the first opening, wherein the first cavity and the second cavity are configured to provide access through the first opening and the second opening to an electrical device coupled to the second side wall, the second side wall extends by a depth from the first back wall, and is sized, for receipt of the second side wall into the electrical box, and wherein the apparatus, when attached to an electrical box and the electrical device, is configured to position at least a portion of the electrical device within the electrical box.

2. The apparatus of claim 1, wherein:
a hinge pin connects the base and the hood, and
the hood rotates along the hinge pin to engage or release from the base.

3. An apparatus comprising:
a hood; and
a base connected to the hood, the base including:
   a first side wall and a first back wall forming a first cavity with a first opening opposite the first back wall, wherein:
      the hood is configured to cover the first opening,
      the first side wall includes a first side wall edge and a second side wall edge opposite the first side wall edge, the first side wall edge being proximate to the first opening and the second side wall edge being proximate to the first back wall, and
      the first back wall includes a second opening to a second cavity, and
   a second side wall defining the second cavity and extending from the first back wall away from the first opening;
   a second cavity back wall attached to the second side wall, opposite to the second opening, and defining a portion of the second cavity,
wherein the first cavity and the second cavity are configured to provide access through the first opening and the second opening to an electrical device that is attachable to the second cavity back wall, and
wherein the apparatus, when attached to an electrical box and the electrical device, is configured to position at least a portion of the electrical device within the electrical box.

4. The apparatus of claim 3, wherein the second cavity back wall includes one or more openings to provide access to the electrical device via an interior cavity formed by the hood and the base.

5. The apparatus of claim 3, wherein the second cavity back wall is formed from a conductive material, and the electrical device is formed from a non-conductive material.

6. The apparatus of claim 3, wherein the base includes:
a first piece that includes:
   the first side wall, and
   the first back wall, and
a second piece that includes:
   the second side wall inserted into the opening in the first back wall, and
   a front wall, and
   wherein the front wall and the first back wall are coupled to connect the first piece and the second piece.

7. The apparatus of claim 6, wherein:
the first piece includes a first aperture in the first back wall,
the second piece includes a second aperture in the front wall, and
a connector, inserted through the first aperture and the second aperture, couples the first piece and the second piece and connects the apparatus to at least one of the electrical box or a structure supporting the electrical box.

8. The apparatus of claim 3, further comprising a spacing element positioned between the base and at least one of the electrical box or a wall associated with the electrical box when the apparatus is connected to the at least one of the electrical box or the wall,
wherein the spacing element includes at least one of a spacer plate or a gasket.

9. An apparatus comprising:
a hood; and
a base connected to the hood,
wherein the base includes:
   a first side wall and a first back wall forming a first cavity with a first opening opposite the first back wall, wherein:
      the hood covers the first opening,
      the first side wall includes a first side wall edge and a second side wall edge opposite the first side wall edge, the first side wall edge being proximate to the first opening and the second side wall edge being proximate to the first back wall, and
      the first back wall includes a second opening to a second cavity, the second cavity extending past the first back wall, and
      a second side wall defining the second cavity and extending from the first back wall away from the first opening,
wherein the first cavity and the second cavity provide access through the first opening and the second opening to an electrical device coupled to the second side wall, and
wherein the second side wall extends by a depth from the first back wall, and is sized, for receipt of the second sidewall into the electrical box.

10. An apparatus comprising:
a hood; and
a base connected to the hood,
wherein the base includes:
   a first side wall and a first back wall forming a first cavity with a first opening opposite the first back wall, wherein:
      the hood covers the first opening,
      the first side wall includes a first side wall edge and a second side wall edge opposite the first side wall edge, the first side wall edge being proximate to the first opening and the second side wall edge being proximate to the first back wall, and
      the first back wall includes a second opening to a second cavity, the second cavity extending past the first back wall, and
      a second side wall defining the second cavity and extending from the first back wall away from the first opening,
   a second cavity back wall attached to the second side wall, opposite to the second opening, that defines a portion of the second cavity, and
wherein the first cavity and the second cavity provide access through the first opening and the second opening to an electrical device coupled to the second side wall, and
wherein the electrical device is attachable to the second cavity back wall.

11. The apparatus of claim 10, wherein the second cavity back wall is formed from a conductive material, and the electrical device is formed from a non-conductive material.

12. The apparatus of claim 10, wherein the base includes:
a first piece that includes:
   the first side wall, and
   the first back wall, and
a second piece that includes:

the second side wall inserted into the opening in the first back wall, and
a front wall, and
wherein the front wall and the first back wall are coupled to connect the first piece and the second piece.

13. The apparatus of claim 12, wherein:
the first piece includes a first aperture in the first back wall,
the second piece includes a second aperture in the front wall, and
a connector, inserted through the first aperture and the second aperture, couples the first piece and the second piece and connects the apparatus to at least one of an electrical box or a wall associated with the electrical box.

14. The apparatus of claim 10, further comprising:
a spacing element positioned between the base and at least one of an electrical box or a wall associated with the electrical box when the apparatus is connected to the at least one of the electrical box or the wall,
wherein the spacing element includes at least one of a spacer plate or a gasket.

15. A method comprising:
attaching an electrical device to a while-in-use (WIU) cover assembly;
positioning the electrical device and a portion of a recess portion of the WIU cover assembly within an electrical box; and
securing, with the electrical device attached to the WIU cover assembly and positioned within the electrical box, the WIU cover assembly to the electrical box;
wherein the WIU cover assembly includes:
a first side wall that defines a first cavity of the WIU cover assembly; and
a second side wall that defines a second cavity of the recess portion of the WIU cover assembly, the second cavity extending from the first cavity, and
wherein the attached electrical device is accessible from within the WIU cover assembly through the first cavity and the second cavity.

* * * * *